(12) United States Patent
Gao et al.

(10) Patent No.: US 10,826,580 B2
(45) Date of Patent: Nov. 3, 2020

(54) METHOD AND DEVICE FOR CONSTRAINING CODEBOOK SUBSET

(71) Applicant: CHINA ACADEMY OF TELECOMMUNICATIONS TECHNOLOGY, Beijing (CN)

(72) Inventors: Qiubin Gao, Beijing (CN); Shanzhi Chen, Beijing (CN); Wenhong Chen, Beijing (CN); Hui Li, Beijing (CN); Runhua Chen, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/570,263

(22) PCT Filed: Mar. 31, 2016

(86) PCT No.: PCT/CN2016/078023
§ 371 (c)(1),
(2) Date: Oct. 27, 2017

(87) PCT Pub. No.: WO2016/184264
PCT Pub. Date: Nov. 24, 2016

(65) Prior Publication Data
US 2018/0138954 A1    May 17, 2018

(30) Foreign Application Priority Data
May 15, 2015    (CN) .......................... 2015 1 0250857

(51) Int. Cl.
*H04B 7/0456*    (2017.01)
*H04B 7/06*    (2006.01)

(52) U.S. Cl.
CPC .......... *H04B 7/0473* (2013.01); *H04B 7/0478* (2013.01); *H04B 7/06* (2013.01); *H04B 7/0623* (2013.01)

(58) Field of Classification Search
CPC ...... H04B 7/0473; H04B 7/0478; H04B 7/06; H04B 7/062
See application file for complete search history.

(56) References Cited

U.S. PATENT DOCUMENTS

| | | |
|---|---|---|
| 6,148,283 A | 11/2000 | Das |
| 8,254,488 B2 | 8/2012 | Khojastepour |

(Continued)

FOREIGN PATENT DOCUMENTS

| | | |
|---|---|---|
| CN | 103597892 A | 2/2014 |
| CN | 103905098 A | 7/2014 |

(Continued)

OTHER PUBLICATIONS

International Search Report for PCT/CN2016/078023, dated Jun. 15, 2016, and its English translation provided by WIPO.

(Continued)

*Primary Examiner* — Sam K Ahn
*Assistant Examiner* — Amneet Singh
(74) *Attorney, Agent, or Firm* — Ladas & Parry, LLP

(57) ABSTRACT

The embodiments of the present disclosure provide a method and a device for constraining a codebook subset. The method includes steps of: determining codebook subset constraint parameters for all or parts of matrix sets for constructing a codebook respectively, each codebook subset constraint parameter indicating an available matrix in a corresponding matrix set; and transmitting the determined codebook subset constraint parameters to a UE. The number (Continued)

---

200 — receiving codebook subset constraint parameters corresponding to all or parts of matrix sets for constructing a codebook, each codebook subset constraint parameter indicating one or more available matrice in a corresponding matrix set 210 — determining available matrices in each matrix set for constructing the codebook in accordance with the received codebook subset constraint parameters 220 — determining active precoding matrices in the codebook in accordance with the available matrices in each matrix set of the matrices in each matrix set for constructing the codebook is far less than the number of precoding matrices in the codebook.

4 Claims, 2 Drawing Sheets

(56) References Cited

U.S. PATENT DOCUMENTS

| | | | |
|---|---|---|---|
| 2009/0147880 A1 | 6/2009 | Wennstrom et al. | |
| 2010/0118997 A1 | 5/2010 | Lee et al. | |
| 2010/0215112 A1* | 8/2010 | Tsai | H04B 7/0408 375/267 |
| 2011/0255635 A1 | 10/2011 | Lee et al. | |
| 2011/0268204 A1 | 11/2011 | Choi et al. | |
| 2011/0268207 A1 | 11/2011 | Choi et al. | |
| 2012/0020433 A1 | 1/2012 | Bhattad et al. | |
| 2012/0044906 A1* | 2/2012 | Chen | H04L 5/001 370/329 |
| 2012/0163487 A1 | 6/2012 | Koyanagi et al. | |
| 2012/0258729 A1 | 10/2012 | Siomina et al. | |
| 2013/0095816 A1 | 4/2013 | Conklin | |
| 2014/0016549 A1 | 1/2014 | Novlan et al. | |
| 2014/0369308 A1 | 12/2014 | Gerstenberger et al. | |
| 2015/0049824 A1* | 2/2015 | Kim | H04B 7/0617 375/267 |
| 2016/0164583 A1* | 6/2016 | Zhang | H04B 7/0617 375/267 |
| 2016/0173252 A1* | 6/2016 | Lee | H04B 7/26 370/329 |
| 2017/0311321 A1* | 10/2017 | Kakishima | H04W 16/28 |

FOREIGN PATENT DOCUMENTS

| | | |
|---|---|---|
| JP | 2009542052 A | 11/2009 |
| JP | 2012506194 A | 3/2012 |
| JP | 2012513149 A | 6/2012 |
| JP | 2013518526 A | 5/2013 |
| JP | 2013529430 A | 7/2013 |
| JP | 2013533653 A | 8/2013 |
| JP | 2014502064 A | 1/2014 |
| WO | 2009/025619 A2 | 2/2009 |

OTHER PUBLICATIONS

Written Opinion of the International Search Authority for PCT/CN2016/078023, dated Jun. 15, 2016, and its English translation provided by Bing.com Microsoft Translator.
International Preliminary Report on Patentability (IPRP; Ch 1) for PCT/CN2016/078023, dated Nov. 30, 2017, and its English translation provided by WIPO.
Written Opinion of the International Search Authority for PCT/CN2016/078023, dated Jun. 15, 2016, and its English translation provided by WIPO.
From EP Application No. 16795751.3, Supplemental Partial European Search Report with Provisional Opinion.
From TW Application No. 105111179, Office Action dated Apr. 12, 2017 with machine English translation from Google.
R1-144911—LG Electronics, "Discussion on DFT-based vertical feedback", 3GPP TSG RAN WG1 Meeting #79; San Francisco, Nov. 17-21, 2014, pp. 1-7.
From Japanese Application No. 2017-556162, Office action dated Aug. 7, 2018 with machine English translation from Global Dossier.

* cited by examiner

METHOD AND DEVICE FOR CONSTRAINING CODEBOOK SUBSET

CROSS-REFERENCE TO RELATED APPLICATIONS

This application is the U.S. national phase of PCT Application No. PCT/CN2016/078023 filed on Mar. 31, 2016, which claims priority to Chinese Patent Application No. 201510250857.3 filed on May 15, 2015, the disclosures of which are incorporated herein by reference in their entireties.

TECHNICAL FIELD

The present disclosure relates to the field of wireless communication technology, in particular to a method and a device for constraining a codebook subset.

BACKGROUND

A closed-loop precoding technology has been introduced into a Long Term Evolution (LTE) Release 8 (Rel-8) system so as to improve the spectral efficiency. For the closed-loop precoding technology, at first an identical set of precoding matrices, i.e., a codebook, is required to be stored at a base station and a User Equipment (UE). Upon the estimation of channel information in accordance with a cell common pilot signal, the UE selects one precoding matrix from the codebook in accordance with a certain criterion, e.g., maximum mutual information or maximum output Signal-to-Interference and Noise Ratio (SINR). Next, the UE feeds an index of the selected precoding matrix, i.e., a Precoding Matrix Indicator (PMI), in the codebook back to the base station through an uplink channel. Finally, the base station may determine the precoding matrix to be used by the UE in accordance with the received index. The precoding matrix reported by the UE may be considered as a quantized value of Channel State Information (CSI).

In a conventional cellular system, antennae of the base station are usually arranged horizontally in an array form. Beams from a transmitter of the base station are merely adjusted in a horizontal direction, and each beam is provided with a fixed down-tilt angle in a vertical direction for each UE. Hence, various beamforming/precoding technologies are adopted on the basis of channel information in the horizontal direction. However, actually a radio signal is transmitted in the space in a three-dimensional (3D) manner, so it is impossible to provide optimal system performance through the fixed down-tilt angle. The beam adjustment in the vertical direction plays a very important role in the enhancement of the system performance. Along with the development of the antenna technology, an active antenna capable of controlling each element independently has currently emerged. Through this kind of two-dimensional (2D) antenna array, it is possible to dynamically adjust the beams in the vertical direction. For a Frequency Division Duplexing (FDD) system, a three-dimensional beamforming/precoding operation needs to be performed on the basis of the CSI reported by the UE. As a possible way, the CSI may be reported on the basis of the codebook, like that adopted by the LTE Rel-8 system all the time.

The codebook for the feedback of the CSI needs to conform with both a configuration of the antenna array and an application scenario, so as to return the CSI accurately. In the case that the 2D antenna array is adopted, there may be a large number of possible application scenarios. In order to match all the possible configurations of the antenna array and application scenarios, a size of the designed codebook will be very large, resulting in large uplink feedback overhead and large implementation complexity at a UE side. One scheme is to constrain a codebook subset, so as to limit available precoding matrices in the codebook, thereby to reduce the implementation complexity at the UE side. In a conventional method for constraining the codebook subset, with respect to each precoding matrix in the codebook, the base station may use a one-bitmap to indicate whether or not the precoding matrix is available for the UE. For example, in the case that an indicator bit has a value of 1, it means the precoding matrix is available, whereas in the case that the indicator bit has a value of 0, it means the precoding matrix is unavailable. However, the codebook for the 2D antenna array may contain a huge number of precoding matrices, e.g., 4096 or even more precoding matrices. At this time, a large number of system resources may be occupied in the case that each precoding matrix is indicated using the bitmap.

SUMMARY

An object of the present disclosure is to provide a method and a device for constraining a codebook subset, so as to solve the problem in the related art where a large number of system resources are occupied.

In one aspect, the present disclosure provides in some embodiments a method for constraining a codebook subset, including steps of: determining codebook subset constraint parameters for all or parts of matrix sets for constructing a codebook respectively, each codebook subset constraint parameter indicating an available matrix in a corresponding matrix set; and transmitting the determined codebook subset constraint parameters to a UE.

In a possible embodiment of the present disclosure, the step of determining the codebook subset constraint parameters for all or parts of the matrix sets for constructing the codebook respectively includes: determining the codebook subset constraint parameters for all or parts of the matrix sets for constructing the codebook respectively in accordance with a configuration of an antenna array; or determining the codebook subset constraint parameters for all or parts of the matrix sets for constructing the codebook respectively in accordance with an application scenario; or determining the codebook subset constraint parameters for all or parts of the matrix sets for constructing the codebook respectively in accordance with the configuration of the antenna array and the application scenario; or determining the codebook subset constraint parameters for all or parts of the matrix sets for constructing the codebook respectively in accordance with a measurement result of an uplink signal transmitted by the UE; or determining the codebook subset constraint parameters for all or parts of the matrix sets for constructing the codebook respectively in accordance with information returned by the UE; or determining the codebook subset constraint parameters for all or parts of the matrix sets for constructing the codebook respectively in accordance with matrix-available information reported by the UE.

In a possible embodiment of the present disclosure, the step of determining the codebook subset constraint parameters for all or parts of the matrix sets for constructing the codebook respectively in accordance with the measurement result of the uplink signal transmitted by the UE includes: measuring the uplink signal transmitted by the UE so as to obtain the measurement result; determining whether or not each matrix in each matrix set for constructing the codebook is available in accordance with the measurement result; and determining the codebook subset constraint parameters for all or parts of the matrix sets for constructing the codebook respectively in accordance with a determination result.

In a possible embodiment of the present disclosure, the step of measuring the uplink signal transmitted by the UE so as to obtain the measurement result includes measuring the uplink signal transmitted by the UE, so as to obtain a horizontal azimuth angle or a vertical azimuth angle of the UE. The step of determining whether or not each matrix in each matrix set for constructing the codebook is available in accordance with the measurement result includes calculating an array response vector correlation coefficient between each matrix in each matrix subset for constructing the codebook and the horizontal azimuth angle or the vertical azimuth angle, comparing the array response vector correlation coefficient with an array response vector correlation coefficient threshold, and determining whether or not the matrix is available in accordance with a comparison result.

In a possible embodiment of the present disclosure, the step of determining the codebook subset constraint parameters for all or parts of the matrix sets for constructing the codebook respectively in accordance with the information returned by the UE includes: ranking precoding matrices in a descending order of usage times, selecting a predetermined number of precoding matrices with the largest usage times in accordance with the information returned by the UE within a predetermined time period, and determining matrices corresponding to the selected precoding matrices; calculating a correlation coefficient between each matrix in each matrix set for constructing the codebook and each of the determined matrices corresponding to the selected precoding matrices, comparing the correlation efficient with a matrix correlation coefficient threshold, and determining whether or not the matrix in each matrix subset is available in accordance with a comparison result; and determining the codebook subset constraint parameters for all or parts of the matrix sets for constructing the codebook respectively in accordance with a determination result.

In a possible embodiment of the present disclosure, the step of determining the codebook subset constraint parameters for all or parts of the matrix sets for constructing the codebook respectively in accordance with the information about the matrix-available information reported by the UE includes: determining whether or not each matrix in each matrix set for constructing the codebook is available in accordance with an available matrix indicated in the matrix-available information reported by the UE, and determining the codebook subset constraint parameters for all or parts of the matrix sets for constructing the codebook in accordance with a determination result; or determining whether or not each matrix in each matrix set for constructing the codebook is available in accordance with an unavailable matrix indicated in the matrix-available information reported by the UE, and determining the codebook subset constraint parameters for all or parts of the matrix sets for constructing the codebook in accordance with a determination result; or determining whether or not each matrix in each matrix set for constructing the codebook in accordance with a matrix-available weight value indicated in the matrix-available information reported by the UE, and determining the codebook subset constraint parameters for all or parts of the matrix sets for constructing the codebook in accordance with a determination result.

In a possible embodiment of the present disclosure, each codebook subset constraint parameter is a bitmap, and each bit in the bitmap corresponds to a matrix in the matrix set and is used to indicate whether or not the matrix is available; or each codebook subset constraint parameter includes a set of index values, and each index value corresponds to an available matrix in the matrix set; or each codebook subset constraint parameter is a bitmap, and each bit in the bitmap corresponds to a matrix subset in the matrix set and is used to indicate whether or not the matrix subset is available; or each codebook subset constraint parameter includes a set of index values, and each index value corresponds to an available matrix subset in the matrix set.

In a possible embodiment of the present disclosure, the method further includes: determining an active codebook of the codebook; generating a bitmap corresponding to the active codebook, each bit in the bitmap corresponding to a precoding matrix in the active codebook and being used to indicate whether or not the precoding matrix is available for calculating and returning CSI; and transmitting the bitmap corresponding to the active codebook to the UE.

In another aspect, the present disclosure provides in some embodiments a method for constraining a codebook subset, including steps of: receiving codebook subset constraint parameters corresponding to all or parts of matrix sets for constructing a codebook, each codebook subset constraint parameter indicating an available matrix in a corresponding matrix set; determining available matrices in each matrix set for constructing the codebook in accordance with the received codebook subset constraint parameters; and determining active precoding matrices in the codebook in accordance with the available matrices in each matrix set.

In a possible embodiment of the present disclosure, the step of determining the active precoding matrices in the codebook in accordance with the available matrices in each matrix set includes: with respect to each precoding matrix in the codebook, determining whether or not all matrices for generating the precoding matrix are available, and determining the precoding matrix where all the matrices are available as the active precoding matrix; or with respect to each precoding matrix in the codebook, determining whether or not there is at least one available matrix in the matrices for generating the precoding matrix, and determining the precoding matrix where there is at least one available matrix as the active precoding matrix.

In a possible embodiment of the present disclosure, the method further includes: determining an active codebook of the codebook in accordance with the determined active precoding matrix, and receiving a bitmap corresponding to the active codebook, each bit of the bitmap corresponding to a precoding matrix of the active codebook and being used to indicate whether or not the precoding matrix is available for calculating and returning CSI; and determining the precoding matrix in the active codebook that is available for calculating and returning the CSI in accordance with the bitmap.

In a possible embodiment of the present disclosure, the method further includes reporting matrix-available information.

In a possible embodiment of the present disclosure, the matrix-available information is used to indicate one or more available matrices, one or more unavailable matrices, or a matrix-available weight value of each matrix in parts of or all the matrix sets.

In a possible embodiment of the present disclosure, the method further includes: determining the matrix-available information in accordance with usage times within a predetermined time period.

In yet another aspect, the present disclosure provides in some embodiments a device for constraining a codebook subset, including: a constraint parameter determination module configured to determine codebook subset constraint parameters for all or parts of matrix sets for constructing a codebook respectively, each codebook subset constraint parameter indicating an available matrix in a corresponding matrix set; and a constraint parameter transmission module configured to transmit the determined codebook subset constraint parameters to a UE.

In a possible embodiment of the present disclosure, the constraint parameter determination module is further configured to: determine the codebook subset constraint parameters for all or parts of the matrix sets for constructing the codebook respectively in accordance with a configuration of an antenna array; or determine the codebook subset constraint parameters for all or parts of the matrix sets for constructing the codebook respectively in accordance with an application scenario; or determine the codebook subset constraint parameters for all or parts of the matrix sets for constructing the codebook respectively in accordance with the configuration of the antenna array and the application scenario; or determine the codebook subset constraint parameters for all or parts of the matrix sets for constructing the codebook respectively in accordance with a measurement result of an uplink signal transmitted by the UE; or determine the codebook subset constraint parameters for all or parts of the matrix sets for constructing the codebook respectively in accordance with information returned by the UE; or determine the codebook subset constraint parameters for all or parts of the matrix sets for constructing the codebook respectively in accordance with matrix-available information reported by the UE.

In a possible embodiment of the present disclosure, in the case of determining the codebook subset constraint parameters for all or parts of the matrix sets for constructing the codebook respectively in accordance with the measurement result of the uplink signal transmitted by the UE, the constraint parameter determination module is further configured to: measure the uplink signal transmitted by the UE so as to obtain the measurement result; determine whether or not each matrix in each matrix set for constructing the codebook is available in accordance with the measurement result; and determine the codebook subset constraint parameters for all or parts of the matrix sets for constructing the codebook respectively in accordance with a determination result.

In a possible embodiment of the present disclosure, in the case of measuring the uplink signal transmitted by the UE so as to obtain the measurement result, the constraint parameter determination module is further configured to: measure the uplink signal transmitted by the UE, so as to obtain a horizontal azimuth angle or a vertical azimuth angle of the UE, and in the case of determining whether or not each matrix in each matrix set for constructing the codebook is available in accordance with the measurement result, the constraint parameter determination module is further configured to calculate an array response vector correlation coefficient between each matrix in each matrix subset for constructing the codebook and the horizontal azimuth angle or the vertical azimuth angle, compare the array response vector correlation coefficient with an array response vector correlation coefficient threshold, and determine whether or not the matrix is available in accordance with a comparison result.

In a possible embodiment of the present disclosure, in the case of determining the codebook subset constraint parameters for all or parts of the matrix sets for constructing the codebook respectively in accordance with the information returned by the UE, the constraint parameter determination module is further configured to: rank precoding matrices in a descending order of usage times, select a predetermined number of precoding matrices with the largest usage times in accordance with the information returned by the UE within a predetermined time period, and determine matrices corresponding to the selected precoding matrices; calculate a correlation coefficient between each matrix in each matrix set for constructing the codebook and each of the determined matrices corresponding to the selected precoding matrices, compare the correlation efficient with a matrix correlation coefficient threshold, and determine whether or not the matrix in each matrix subset is available in accordance with a comparison result; and determine the codebook subset constraint parameters for all or parts of the matrix sets for constructing the codebook respectively in accordance with a determination result.

In a possible embodiment of the present disclosure, in case of determining the codebook subset constraint parameters for all or parts of the matrix sets for constructing the codebook respectively in accordance with the information about the matrix-available information reported by the UE, the constraint parameter determination module is configured to: determine whether or not each matrix in each matrix set for constructing the codebook is available in accordance with an available matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook is available in accordance with an unavailable matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook in accordance with a matrix-available weight value indicated in the matrix-available information reported by the UE, and determine the codebook subset constraint parameters for all or parts of the matrix sets for constructing the codebook in accordance with a determination result.

In a possible embodiment of the present disclosure, each codebook subset constraint parameter is a bitmap, and each bit in the bitmap corresponds to a matrix in the matrix set and is used to indicate whether or not the matrix is available; or each codebook subset constraint parameter includes a set of index values, and each index value corresponds to an available matrix in the matrix set; or each codebook subset constraint parameter is a bitmap, and each bit in the bitmap corresponds to a matrix subset in the matrix set and is used to indicate whether or not the matrix subset is available; or each codebook subset constraint parameter includes a set of index values, and each index value corresponds to an available matrix subset in the matrix set.

In a possible embodiment of the present disclosure, the device further includes a secondary constraint module configured to: determine an active codebook of the codebook; generate a bitmap corresponding to the active codebook, each bit in the bitmap corresponding to a precoding matrix in the active codebook and being used to indicate whether or not the precoding matrix is available for calculating and returning CSI; and transmit the bitmap corresponding to the active codebook to the UE.

In still yet another aspect, the present disclosure provides in some embodiments a base station, including a processor, a memory and a transceiver. The processor is configured to read programs stored in the memory, so as to: determine codebook subset constraint parameters for all or parts of matrix sets for constructing a codebook respectively, each codebook subset constraint parameter indicating an available matrix in a corresponding matrix set; and transmit through the transceiver the determined codebook subset constraint parameters to a UE.

In a possible embodiment of the present disclosure, in the case of determining the codebook subset constraint parameters for all or parts of the matrix sets for constructing the codebook respectively, the processor is further configured to read the program stored in the memory, so as to: determine the codebook subset constraint parameters for all or parts of the matrix sets for constructing the codebook respectively in accordance with a configuration of an antenna array; or determine the codebook subset constraint parameters for all or parts of the matrix sets for constructing the codebook respectively in accordance with an application scenario; or determine the codebook subset constraint parameters for all or parts of the matrix sets for constructing the codebook respectively in accordance with the configuration of the antenna array and the application scenario; or determine the codebook subset constraint parameters for all or parts of the matrix sets for constructing the codebook respectively in accordance with a measurement result of an uplink signal transmitted by the UE; or determine the codebook subset constraint parameters for all or parts of the matrix sets for constructing the codebook respectively in accordance with information returned by the UE; or determine the codebook subset constraint parameters for all or parts of the matrix sets for constructing the codebook respectively in accordance with matrix-available information reported by the UE.

In a possible embodiment of the present disclosure, in the case of determining the codebook subset constraint parameters for all or parts of the matrix sets for constructing the codebook respectively in accordance with the measurement result of the uplink signal transmitted by the UE, the processor is further configured to read the program stored in the memory, so as to: measure the uplink signal transmitted by the UE so as to obtain the measurement result; determine whether or not each matrix in each matrix set for constructing the codebook is available in accordance with the measurement result; and determine the codebook subset constraint parameters for all or parts of the matrix sets for constructing the codebook respectively in accordance with a determination result.

In a possible embodiment of the present disclosure, in the case of measuring the uplink signal transmitted by the UE so as to obtain the measurement result, the processor is further configured to read the program stored in memory, so as to measure the uplink signal transmitted by the UE, so as to obtain a horizontal azimuth angle or a vertical azimuth angle of the UE. In the case of determining whether or not each matrix in each matrix set for constructing the codebook is available in accordance with the measurement result, the processor is further configured to read the program stored in the memory, so as to calculate an array response vector correlation coefficient between each matrix in each matrix subset for constructing the codebook and the horizontal azimuth angle or the vertical azimuth angle, compare the array response vector correlation coefficient with an array response vector correlation coefficient threshold, and determine whether or not the matrix is available in accordance with a comparison result.

In a possible embodiment of the present disclosure, in case of determining the codebook subset constraint parameters for all or parts of the matrix sets for constructing the codebook respectively in accordance with the information returned by the UE, the processor is further configured to read the program stored in the memory, so as to: rank precoding matrices in a descending order of usage times, select a predetermined number of precoding matrices with the largest usage times in accordance with the information returned by the UE within a predetermined time period, and determine matrices corresponding to the selected precoding matrices; calculate a correlation coefficient between each matrix in each matrix set for constructing the codebook and each of the determined matrices corresponding to the selected precoding matrices, compare the correlation efficient with a matrix correlation coefficient threshold, and determine whether or not the matrix in each matrix subset is available in accordance with a comparison result; and determine the codebook subset constraint parameters for all or parts of the matrix sets for constructing the codebook respectively in accordance with a determination result.

In a possible embodiment of the present disclosure, in the case of determining the codebook subset constraint parameters for all or parts of the matrix sets for constructing the codebook respectively in accordance with the information about the matrix-available information reported by the UE, the processor is further configured to read the program stored in the memory, so as to: determine whether or not each matrix in each matrix set for constructing the codebook is available in accordance with an available matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook is available in accordance with an unavailable matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook in accordance with a matrix-available weight value indicated in the matrix-available information reported by the UE, and determine the codebook subset constraint parameters for all or parts of the matrix sets for constructing the codebook in accordance with a determination result.

In a possible embodiment of the present disclosure, each codebook subset constraint parameter is a bitmap, and each bit in the bitmap corresponds to a matrix in the matrix set and is used to indicate whether or not the matrix is available; or each codebook subset constraint parameter includes a set of index values, and each index value corresponds to an available matrix in the matrix set; or each codebook subset constraint parameter is a bitmap, and each bit in the bitmap corresponds to a matrix subset in the matrix set and is used to indicate whether or not the matrix subset is available; or each codebook subset constraint parameter includes a set of index values, and each index value corresponds to an available matrix subset in the matrix set.

In a possible embodiment of the present disclosure, the processor is further configured to read the program stored in the memory, so as to: determine an active codebook of the codebook; generate a bitmap corresponding to the active codebook, each bit in the bitmap corresponding to a precoding matrix in the active codebook and used to indicate whether or not the precoding matrix is available for calculating and returning CSI; and transmit through the transceiver the bitmap corresponding to the active codebook to the UE.

In still yet another aspect, the present disclosure provides in some embodiments a device for constraining a codebook subset, including: a constraint parameter reception module configured to receive codebook subset constraint parameters corresponding to all or parts of matrix sets for constructing a codebook, each codebook subset constraint parameter indicating an available matrix in a corresponding matrix set; an available matrix determination module configured to determine available matrices in each matrix set for constructing the codebook in accordance with the received codebook subset constraint parameters; and an active precoding matrix determination module configured to determine active precoding matrices in the codebook in accordance with the available matrices in each matrix set.

In a possible embodiment of the present disclosure, the active precoding matrix determination module is further configured to: with respect to each precoding matrix in the codebook, determine whether or not all matrices for generating the precoding matrix are available, and determine the precoding matrix where all the matrices are available as the active precoding matrix; or with respect to each precoding matrix in the codebook, determine whether or not there is at least one available matrix in the matrices for generating the precoding matrix, and determine the precoding matrix where there is at least one available matrix as the active precoding matrix.

In a possible embodiment of the present disclosure, the device further includes a secondary constraint module configured to: determine an active codebook of the codebook in accordance with the determined active precoding matrix, and receive a bitmap corresponding to the active codebook, each bit of the bitmap corresponding to a precoding matrix of the active codebook and being used to indicate whether or not the precoding matrix is available for calculating and returning CSI; and determine the precoding matrix in the active codebook that is available for calculating and returning the CSI in accordance with the bitmap.

In a possible embodiment of the present disclosure, the device further includes a matrix-available information reporting module configured to report matrix-available information.

In a possible embodiment of the present disclosure, the matrix-available information is used to indicate one or more available matrices, one or more unavailable matrices, or a matrix-available weight value of each matrix in parts or all the matrix sets.

In a possible embodiment of the present disclosure, the matrix-available information determination module is further configured to determine the matrix-available information in accordance with usage times within a predetermined time period.

In still yet another aspect, the present disclosure provides in some embodiments a UE, including a processor, a memory and a transceiver. The processor is configured to read programs stored in the memory, so as to: receive through the transceiver codebook subset constraint parameters corresponding to all or parts of matrix sets for constructing a codebook, each codebook subset constraint parameter indicating an available matrix in a corresponding matrix set; determine available matrices in each matrix set for constructing the codebook in accordance with the received codebook subset constraint parameters; and determine active precoding matrices in the codebook in accordance with the available matrices in each matrix set.

In a possible embodiment of the present disclosure, in the case of determining the active precoding matrices in the codebook, the processor is further configured to read the program stored in the memory, so as to: with respect to each precoding matrix in the codebook, determine whether or not all matrices for generating the precoding matrix are available, and determine the precoding matrix where all the matrices are available as the active precoding matrix; or with respect to each precoding matrix in the codebook, determine whether or not there is at least one available matrix in the matrices for generating the precoding matrix, and determine the precoding matrix where there is at least one available matrix as the active precoding matrix.

In a possible embodiment of the present disclosure, the processor is further configured to read the program stored in the memory, so as to: determine an active codebook of the codebook in accordance with the determined active precoding matrix, and receive through the transceiver a bitmap corresponding to the active codebook, each bit of the bitmap corresponding to a precoding matrix of the active codebook and being used to indicate whether or not the precoding matrix is available for calculating and returning CSI; and determine the precoding matrix in the active codebook that is available for calculating and returning the CSI in accordance with the bitmap.

In a possible embodiment of the present disclosure, the processor is further configured to read the program stored in the memory, so as to report through the transceiver matrix-available information.

In a possible embodiment of the present disclosure, the matrix-available information is used to indicate one or more available matrices, one or more unavailable matrices, or a matrix-available weight value of each matrix in parts or all the matrix sets.

In a possible embodiment of the present disclosure, the processor is further configured to read the programs stored in the memory, so as to determine the matrix-available information in accordance with usage times within a predetermined time period.

According to the embodiments of the present disclosure, the codebook subset constraint parameters may be determined for all or parts of the matrix sets for constructing the codebook and then issued to the UE, and each codebook subset constraint parameter indicates an available matrix in the corresponding matrix set, such that the UE may determine the available matrices in the matrix sets for constructing the codebook in accordance with the codebook subset constraint parameters. The precoding matrix is generated on the basis of the matrices, such that in the case that the available matrices in the matrix sets have been obtained, it is able to determine the active precoding matrix, thereby to constrain the codebook subset. The number of the matrices contained in the matrix sets for constructing the codebook is fall less than the number of the precoding matrices in the codebook, so the number of system resources for the transmission of the codebook subset constraint parameters is fall smaller than the number of system resources for a conventional method for constraining the codebook subset. As a result, it is able to reduce the number of the occupied system resources, thereby to reduce signaling overhead.

DETAILED DESCRIPTION OF THE EMBODIMENTS

The present disclosure will be described hereinafter in conjunction with the drawings and embodiments.

Figure 1:
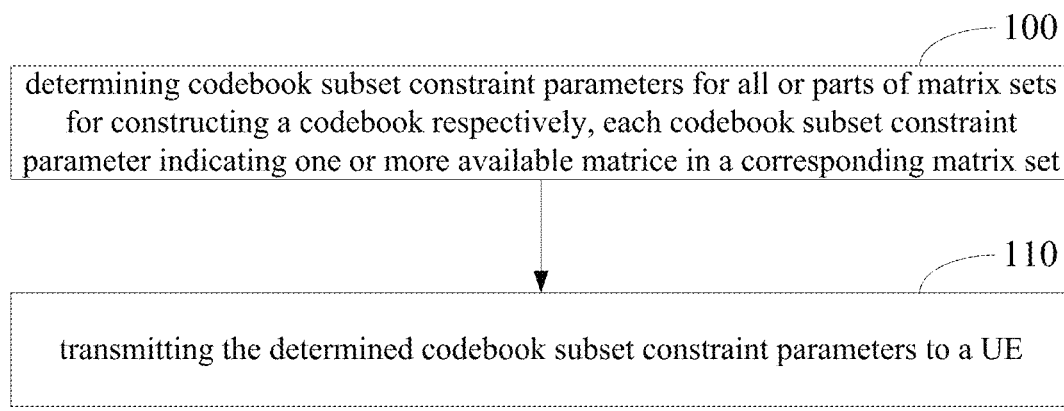
FIG. 1 is a flow chart of a method for constraining a codebook subset according to one embodiment of the present disclosure.

The present disclosure provides in some embodiments a method for constraining a codebook subset at a base station side which, as shown in FIG. 1, includes the following steps.

Step 100: determining codebook subset constraint parameters for all or parts of matrix sets for constructing a codebook respectively, each codebook subset constraint parameter indicating an available matrix in a corresponding matrix set.

In some embodiments of the present disclosure, in the case that the codebook subset constraint is performed with respect to UE indicated by A and a codebook A' is stored in the UE indicated by A in FIG. 1, the codebook in Step 100 is just the same as codebook A' at the base station side.

In the case that the codebook A' consists of K matrix sets, P codebook subset constraint parameters may be determined in Step 100. Each codebook subset constraint parameter corresponds to one matrix set in the K matrix sets, where P may be equal to or smaller than K.

Step 110: transmitting the determined codebook subset constraint parameters to a UE.

In some embodiments of the present disclosure, an implementation mode of Step 110 will not be particularly defined. For example, the determined codebook subset constraint parameters may be transmitted to the UE through high-layer signaling, or through physical-layer signaling, or in any other ways.

According to the method in the embodiments of the present disclosure, the codebook subset constraint parameters may be determined for all or parts of the matrix sets for constructing the codebook and then issued to the UE, and each codebook subset constraint parameter indicates an available matrix in the corresponding matrix set, such that the UE may determine the available matrices in the matrix sets for constructing the codebook in accordance with the codebook subset constraint parameters. The precoding matrix is generated on the basis of the matrices, such that in the case that the available matrices in the matrix sets have been obtained, it is able to determine the active precoding matrix, thereby to constrain the codebook subset. The number of the matrices contained in the matrix sets for constructing the codebook is fall less than the number of the precoding matrices in the codebook, so the number of system resources for the transmission of the codebook subset constraint parameters is fall smaller than the number of system resources for a conventional method for constraining the codebook subset. As a result, it is able to reduce the number of the occupied system resources, thereby to reduce signaling overhead.

In some embodiments of the present disclosure, there may be various implementation modes for Step 100, and some of them will be described hereinafter.

First Implementation Mode for Step 100

In this mode, the codebook subset constraint parameters for all or parts of the matrix sets for constructing the codebook may be determined respectively in accordance with a configuration of an antenna array.

In some embodiments of the present disclosure, the configuration of the antenna array may include, but be not limited to, a pattern of the antenna array, spacing between antenna units, and a polarization direction. The pattern of the antenna array may include, but be not limited to, at least one of the number of antennae in a horizontal dimension and the number of antennae in a vertical dimension.

In the case of determining the codebook subset constraint parameters in accordance with the configuration of the antenna array, matrices (i.e., available matrices) which belong to the matrix sets for constructing the codebook and match the configuration of the antenna array may be determined, so as to obtain the codebook subset constraint parameters.

For example, one matrix set for constructing the codebook is a set of N-point Discrete Fourier Transformation (DFT) vectors, i.e., each matrix in the matrix set is a DFT vector and the matrix set includes N vectors. An $m^{th}$ vector may be represented as $$V_m = \begin{bmatrix} 1 & e^{-j2\pi\frac{m}{N}} & \ldots & e^{-j2\pi\frac{m(L-1)}{N}} \end{bmatrix}^T,$$

where L represents a length of each vector. In the case that the spacing is a half of the carrier wavelength (i.e., the spacing is 0.5 times the carrier wavelength), the available matrices may be selected using all vectors. In the case that the spacing between the antenna units is equal to a carrier wavelength, the available matrices may be selected using the following equation: $\{V_m\}_{m=2i, i=0,1,\ldots,\lfloor N/2 \rfloor}$. And in the case that the spacing is four times the carrier wavelength, the available matrices may be selected using the following equation: $\{V_m\}_{m=4i, i=0,1,\ldots,\lfloor N/4 \rfloor}$.

Second Implementation Mode for Step 100

In this mode, the codebook subset constraint parameters for all or parts of the matrix sets for constructing the codebook may be determined respectively in accordance with an application scenario.

The application scenario may include, but be not limited to, spacing between the base stations, a height of a base station antenna, UE height distribution, and UE spatial angle distribution.

In the case of determining the codebook subset constraint parameters in accordance with the application scenario, the matrices (i.e., the available matrices) which belong to the matrix sets for constructing the codebook and match the application scenario may be determined, so as to obtain the codebook subset constraint parameters.

For example, one matrix set for constructing the codebook is a set of N Discrete Fourier Transformation (DFT) vectors, i.e., each matrix in the matrix set is a DFT vector and the matrix set includes N vectors. An $m^{th}$ vector may be represented as $$V_m = \begin{bmatrix} 1 & e^{-j2\pi\frac{m}{N}} & \ldots & e^{-j2\pi\frac{m(L-1)}{N}} \end{bmatrix}^T,$$

where L represents a length of each vector. Each DFT vector may correspond to one spatial angle. The DFT vectors that match a UE spatial angle may be selected as the available matrices in accordance with the UE spatial angle distribution.

Third Implementation Mode for Step 100

In this mode, the codebook subset constraint parameters for all or parts of the matrix sets for constructing the codebook may be determined respectively in accordance with the configuration of the antenna array and the application scenario.

In the case of determining the codebook subset constraint parameters for all or parts of the matrix sets for constructing the codebook respectively in accordance with the configuration of the antenna array and the application scenario, the matrices (i.e., the available matrices) which belong to the matrix sets for constructing the codebook and match the configuration of the antenna array and the application scenario may be determined, so as to obtain the codebook subset constraint parameter.

Fourth Implementation Mode for Step 100

In this mode, the codebook subset constraint parameters for all or parts of the matrix sets for constructing the codebook may be determined respectively in accordance with a measurement result of an uplink signal transmitted by the UE.

There may exist various ways for this implementation mode. For example, the uplink signal from the UE may be measured so as to obtain a measurement result, then whether or not each matrix in each matrix set for constructing the codebook may be determined in accordance with the measurement result, and then the codebook subset constraint parameters may be determined for parts of or all the matrix sets in accordance with a determination result.

In the case that all the matrices in a certain matrix set are available, the codebook subset constraint parameter may be determined, or may not be determined, for the matrix set.

The measured uplink signal may include, but be not limited to, an uplink Sounding Reference Signal (SRS).

Further, the measurement result obtained by measuring the uplink signal transmitted by the UE may include, but be not limited to, a horizontal azimuth angle or a vertical azimuth angle of the UE. Correspondingly, the step of determining whether or not each matrix in each matrix set for constructing the codebook respectively in accordance with the measurement result may include calculating an array response vector correlation coefficient between each matrix in each matrix subset for constructing the codebook and the horizontal azimuth angle or the vertical azimuth angle, comparing the array response vector correlation coefficient with an array response vector correlation coefficient threshold, and determining whether or not the matrix is available in accordance with a comparison result. For example, in the case that an array response vector correlation coefficient between a certain matrix and the horizontal azimuth angle or the vertical azimuth angle is greater than the array response vector correlation coefficient threshold, the matrix may be an available matrix, and otherwise, it may be an unavailable matrix.

The array response vector correlation coefficient threshold may be set in accordance with the practical need, or determined through simulation.

Of course, the measurement result obtained after measuring the uplink signal may also be a channel. Correspondingly, matrices may be selected in accordance with a signal obtained through the measurement, and then the matrices may be counted in a reverse manner so as to determine the matrices with higher adoption possibility, thereby to determine whether or not the matrix is available.

It should be appreciated that, based on the fourth implementation mode, it is able to further determine the codebook subset constraint parameters in conjunction with the configuration of the antenna array and/or the application scenario.

Fifth Implementation Mode for Step 100

In this mode, the codebook subset constraint parameters for all or parts of the matrix sets for constructing the codebook may be determined respectively in accordance with information returned by the UE.

There may exist various ways for this implementation mode. For example, precoding matrices may be ranked in a descending order of usage times, a predetermined number of precoding matrices with the largest usage times may be selected in accordance with the information returned by the UE within a predetermined time period, and matrices corresponding to the selected precoding matrices may be determined. Next, a correlation coefficient between each matrix in each matrix set for constructing the codebook and each of the determined matrices corresponding to the selected precoding matrices may be calculated and then compared with a matrix correlation coefficient threshold, and whether or not the matrix in each matrix subset is available may be determined in accordance with a comparison result. Finally, the codebook subset constraint parameters for all or parts of the matrix sets for constructing the codebook may be determined respectively in accordance with a determination result. For example, in the case that a correlation coefficient between a certain matrix and each of the determined matrices is greater than the matrix correlation coefficient threshold, the matrix may be an available matrix, and otherwise, it may be an unavailable matrix.

The matrix correlation coefficient threshold may be set in accordance with the practical need, or determined through simulation. The information returned by the UE may include, but be not limited to, a PMI.

It should be appreciated that, based on the fifth implementation mode, it is able to further determine the codebook subset constraint parameters in conjunction with the configuration of the antenna array and/or the application scenario.

Sixth Implementation Mode for Step 100

In this mode, the codebook subset constraint parameters for all or parts of the matrix sets for constructing the codebook may be determined respectively in accordance with matrix-available information reported by the UE.

The matrix-available information may be used to specifically indicate whether or not the matrix is available (i.e., to enable the UE to recommend the available matrix to the base station), or indicate a matrix-available weight value (i.e., the UE's preference regarding the matrix).

To be specific, whether or not each matrix in each matrix set for constructing the codebook is available may be determined in accordance with the available matrix indicated in the matrix-available information reported by the UE, and then the codebook subset constraint parameters may be determined for all or parts of the matrix sets in accordance with a determination result. The matrix-available information may be a bitmap and each bit in the bitmap may indicate whether or not a matrix is available, or the matrix-available information may be a set of index values and each index value corresponds to an available matrix.

To be specific, whether or not each matrix in each matrix set for constructing the codebook is available may be determined in accordance with the unavailable matrix indicated in the matrix-available information reported by the UE, and then the codebook subset constraint parameters may be determined for all or parts of the matrix sets in accordance with a determination result. The matrix-available information may be a bitmap and each bit in the bitmap may indicate whether or not a matrix is available, or the matrix-available information may be a set of index values and each index value corresponds to an unavailable matrix.

To be specific, whether or not each matrix in each matrix set for constructing the codebook is available may be determined in accordance with the matrix-available weight value indicated in the matrix-available information reported by the UE, and then the codebook subset constraint parameters may be determined for all or parts of the matrix sets in accordance with a determination result. A larger matrix-available weight value means a larger preference value of the UE for the corresponding matrix, so the matrix having a matrix-available weight value greater than a predetermined weight threshold may be determined as the available matrix.

It should be appreciated that, based on the sixth implementation mode, it is able to further determine the codebook subset constraint parameters in conjunction with the configuration of the antenna array and/or the application scenario.

In a possible embodiment of the present disclosure, each codebook subset constraint parameter may be a bitmap, and each bit in the bitmap may correspond to one matrix in the matrix set and may be used to indicate whether or not the matrix is available. For example, in the case that a bit has a value of 1, it means that the corresponding matrix is available, and in the case that a bit has a value of 0, it means that the corresponding matrix is unavailable. In another possible embodiment of the present disclosure, each bit in the bitmap may correspond to one matrix subset in the matrix set and may be used to indicate whether or not the matrix subset is available. For example, in the case that a bit has a value of 1, it means that the corresponding matrix subset is available, and in the case that a bit has a value of 0, it means that the corresponding matrix subset is unavailable.

Each codebook subset constraint parameter may also include a set of index values, and each index value may correspond to one available matrix in the matrix set or one available matrix subset in the matrix set.

In the case that one bit in the bitmap corresponds to one matrix subset or one index value corresponds to one matrix subset, each matrix set may be divided into several matrix subsets. The available matrix subset refer to a matrix subset in which all or parts of the matrices are available, and it may be determined according to the practical need or through simulation.

The matrix set may be divided in various ways, e.g., the matrices with an identical number of columns may belong to a matrix subset.

In a possible embodiment of the present disclosure, the codebook subset constraint may be performed for the second time. For example, an active codebook of the codebook may be determined and then a bitmap corresponding to the active codebook may be generated. Each bit in the bitmap may correspond to a precoding matrix in the active codebook and may be used to indicate whether or not the precoding matrix is available for calculating and returning CSI. Then, the bitmap corresponding to the active codebook may be transmitted to the UE. For another example, an active codebook of the codebook may be determined and then a set of index values corresponding to the active codebook may be generated. Each index value may correspond to a precoding matrix in the active codebook that is available for calculating and returning CSI. Then, the set of index values corresponding to the active codebook may be transmitted to the UE. In another possible embodiment of the present disclosure, the codebook subset constraint may be performed with respect to the active codebook for the second time.

In some embodiments of the present disclosure, the active codebook refers to a codebook consisting of active precoding matrices.

In some embodiments of the present disclosure, each active precoding matrix refers to a precoding matrix generated by available matrices in each matrix set for constructing the codebook.

Figure 2:
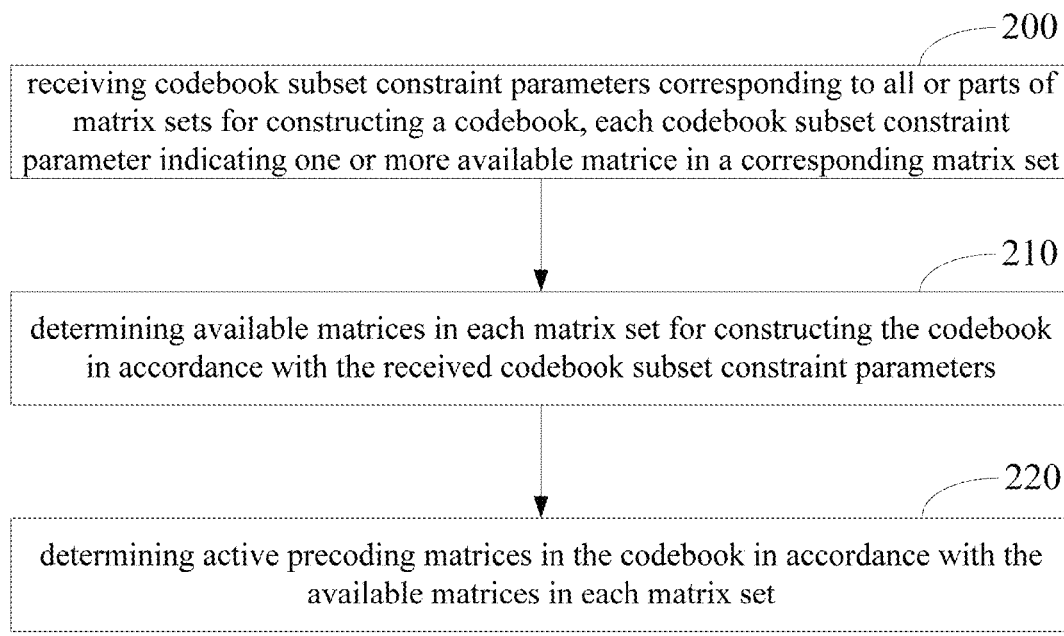
FIG. 2 is a flow chart of another method for constraining a codebook subset according to one embodiment of the present disclosure.

The present disclosure further provides in some embodiments a method for constraining a codebook subset at a UE side which, as shown in FIG. 2, includes the following steps.

Step 200: receiving codebook subset constraint parameters corresponding to all or parts of matrix sets for constructing a codebook, each codebook subset constraint parameter indicating an available matrix in a corresponding matrix set. The codebook in Step 200 is same as a codebook stored at the UE side.

Step 210: determining available matrices in each matrix set for constructing the codebook in accordance with the received codebook subset constraint parameters. In the case that all the matrices in a matrix set are available, no codebook subset constraint parameter may be received. In the case that no codebook subset constraint parameter corresponding to a certain matrix set has been received at the UE side, it means that all the matrices in the matrix set are available.

Step 220: determining active precoding matrices in the codebook in accordance with the available matrices in each matrix set.

It may be defined that a precoding matrix is active only in the case that all the matrices for generating the precoding matrix are available, or the precoding matrix is an active one as long as one matrix for generating the precoding matrix is available. Of course, the active precoding matrix may be defined in any other ways, which will not be particularly defined herein.

According to the method in the embodiments of the present disclosure, the UE may receive the codebook subset constraint parameters for all or parts of the matrix sets for constructing the codebook, and each codebook subset constraint parameter indicates an available matrix in the corresponding matrix set, such that the UE may determine the available matrices in the matrix sets for constructing the codebook in accordance with the codebook subset constraint parameters. The precoding matrix is generated on the basis of the matrices, such that in the case that the available matrices in the matrix sets have been obtained, it is able to determine the active precoding matrix, thereby to constrain the codebook subset. The number of the matrices contained in the matrix sets for constructing the codebook is fall less than the number of the precoding matrices in the codebook, so the number of system resources for the transmission of the codebook subset constraint parameters is fall smaller than the number of system resources for a conventional method for constraining the codebook subset. As a result, it is able to reduce the number of the occupied system resources, thereby to reduce signaling overhead.

After the determination of the active precoding matrix, the UE may measure and return CSI in accordance with the active precoding matrix in the codebook. The UE may select the matrices merely from the active precoding matrix. There may exist two possible ways for the UE to return the CSI.

In a first way, a PMI returned by the UE may be an index value of the selected precoding matrix in an original codebook. At this time, it is impossible to reduce the feedback overhead.

In a second way, the PMI returned by the UE may be an index value of the selected precoding matrix in an active codebook. The active codebook is a codebook consisting of the active precoding matrices in the original codebook. At this time, it is able to reduce the feedback overhead and the calculation complexity of the UE.

In a possible embodiment of the present disclosure, the codebook subset constraint may be performed for the second time. For example, the active codebook of the codebook may be determined in accordance with the determined active precoding matrices, and then a bitmap corresponding to the active codebook may be received. Each bit in the bitmap may correspond to one precoding matrix in the active codebook and may be used to indicate whether or not the precoding matrix is available for calculating and returning the CSI. Then, the precoding matrix in the codebook that is available for calculating and returning the CSI may be determined in accordance with the bitmap.

In a possible embodiment of the present disclosure, the method further includes reporting matrix-available information.

In a possible embodiment of the present disclosure, the matrix-available information indicates available matrices in parts of or all the matrix sets, or unavailable matrices in parts of or all the matrix sets, or a matrix-available weight value of each matrix in parts of or all the matrix sets. For example, the matrix-available weight value may be defined as an integer within the range of 0 to 15 inclusively. In the case that a matrix has a larger matrix-available weight value, it means the UE is inclined to make the matrix available.

In a possible embodiment of the present disclosure, the matrix-available information may be determined in accordance with a number of usage times within a predetermined time period.

For example, the UE may report the matrix-available information periodically. To be specific, in the case that the UE determines, through measurement, that a precoding matrix generated by some matrices in a matrix set is of less possibility to be selected by the UE, the UE may notify the base station to set these matrices as unavailable.

In a possible embodiment of the present disclosure, the UE may further calculate and return CSI in accordance with the determined active precoding matrix. Of course, in the case that the codebook subset constraint has been performed for the second time, the CSI may be calculated and returned in accordance with the determined precoding matrix that is available for calculating and returning the CSI.

The method in the embodiments of the present disclosure will be described hereinafter in more details in conjunction with the following application scenarios.

In one application scenario, the codebook A' stored in UE1 consists of two matrix sets, and each precoding matrix in the codebook is generated after the calculation on matrices in the two matrix sets.

One of the matrix sets is marked as S1, and each matrix in the matrix set includes one column, i.e., a column vector. There are M1 vectors, i.e., $V_1, V_2, \ldots,$ and $V_{M1}$.

The other matrix set is marked as S2, and each matrix in the matrix set includes one column, i.e., a column vector. There are M2 vectors, i.e., $W_1, W_2, \ldots,$ and $W_{M2}$.

For example, each vector in the matrix set S1 is a DFT vector. In a possible embodiment of the present disclosure, the vectors are Q-point DFT vectors, and Q=16, 32 and 64. In another possible embodiment of the present disclosure, M1=Q, so $$V_{m_1} = \left[ 1 \quad e^{-j2\pi\frac{m_1}{Q}} \quad \ldots \quad e^{-j2\pi\frac{m_1(G-1)}{Q}} \right]^T,$$

where G represents a length of the DFT vector, and $m_1=1, 2, \ldots,$ and M1.

For example, each vector in the matrix set S2 is a DFT vector. In a possible embodiment of the present disclosure, the vectors are Q-point DFT vectors, and Q=16, 32 and 64. In another possible embodiment of the present disclosure, M2=Q, so $$W_{m_2} = \left[ 1 \quad e^{-j2\pi\frac{m_2}{Q}} \quad \ldots \quad e^{-j2\pi\frac{m_2(G-1)}{Q}} \right]^T,$$

where G represents a length of the DFT vector, and $m_2=1, 2, \ldots,$ and M2.

Hence, the codebook A' with a rank being 1 may include the following precoding matrix:

$$\left\{ \begin{bmatrix} V_{m_1} \otimes W_{m_2} \\ V_{m_1} \otimes W_{m_2} \end{bmatrix}, \begin{bmatrix} V_{m_1} \otimes W_{m_2} \\ -V_{m_1} \otimes W_{m_2} \end{bmatrix} \right\}_{m_1=1,2,\ldots,M_1; m_2=1,2,\ldots,M_2}, \text{or} \quad (1)$$

$$\left\{ \begin{bmatrix} W_{m_2} \otimes V_{m_1} \\ W_{m_2} \otimes V_{m_1} \end{bmatrix}, \begin{bmatrix} W_{m_2} \otimes V_{m_1} \\ W_{m_2} \otimes -V_{m_1} \end{bmatrix} \right\}_{m_1=1,2,\ldots,M_1; m_2=1,2,\ldots,M_2}. \quad (2)$$

In order to perform the codebook subset constraint on UE1, the base station may determine the codebook subset constraint parameters. To be specific, the codebook subset constraint parameters may be determined in accordance with at least one of the configuration of the antenna array of the base station, the application scenario, the measurement result obtained by measuring the uplink signal from the UE, the information returned by the UE, and the matrix-available information reported by the UE. In addition, the codebook subset constraint parameters may be determined for each of S1 and S2.

In the embodiment of the present disclosure, the codebook subset constraint parameters corresponding to the matrix set S1 may be a bitmap B1 with a length of M1, and each bit in the bitmap may correspond to one vector in the matrix set S1. The codebook subset constraint parameters corresponding to the matrix set S2 may be a bitmap B2 with a length of M2, and each bit in the bitmap may correspond to one vector in the matrix set S2. Hence, the active precoding matrix in the codebook may include $$\left\{ \begin{bmatrix} V_{m_1} \otimes W_{m_2} \\ V_{m_1} \otimes W_{m_2} \end{bmatrix}, \begin{bmatrix} V_{m_1} \otimes W_{m_2} \\ -V_{m_1} \otimes W_{m_2} \end{bmatrix} \right\}_{\substack{m_1=1,2,\ldots,M_1; m_2=1,2,\ldots,M_2 \\ B1(m_1)=1, B2(m_2)=1}}, \quad (3)$$

where Bi(mi) represents an (mi)$^{th}$ bit in the bitmap Bi.

It should be appreciated that, the codebook subset constraint parameters may also be represented in the form of index values.

The base station may transmit the determined codebook subset constraint parameters to UE1. UE1 may then determine the available matrices in the matrix set S1 and the matrix set S2 in accordance with the received codebook subset constraint parameters, e.g., UE1 may determine the matrices corresponding to the bits having a value of 1 in the bitmap as the available matrices. Then, UE1 may determine the active precoding matrix in the codebook A' in accordance with the available matrices in the matrix set S1 and the matrix set S2, with reference to the above formula (3). After the determination of the active precoding matrix, UE1 may measure and return the CSI in accordance with the active precoding matrix.

In another application scenario, the codebook A' stored in UE1 consists of two matrix sets (S1 and S2), and one block of each precoding matrix in the codebook is generated after the calculation on matrices in the two matrix sets.

The precoding matrix in the codebook A' may be calculated through the following formula:

$$W = W_1 W_2 = \begin{bmatrix} Z \otimes X & 0 \\ 0 & Z \otimes X \end{bmatrix} W_2, \quad (4)$$

where Z represents a $D_z \times M_z$ matrix and belongs to the matrix set S1, and X represents a $D_x \times M_x$ matrix and belongs to the matrix set S2. The number of the matrices in the matrix set S1 is $N_z$, and the number of the matrices in the matrix set S2 is $N_x$.

In order to perform the codebook subset constraint on UE1, the base station may determine the codebook subset constraint parameters. To be specific, the codebook subset constraint parameters may be determined in accordance with at least one of the configuration of the antenna array of the base station, the application scenario, the measurement result obtained by measuring the uplink signal from the UE, the information returned by the UE, and the matrix-available information reported by the UE. In addition, the codebook subset constraint parameters may be determined for each of S1 and S2.

In the embodiment of the present disclosure, the codebook subset constraint parameters corresponding to the matrix set S1 may be a bitmap B1 with a length of $N_z$, and each bit in the bitmap may correspond to one matrix in the matrix set S1. The codebook subset constraint parameters corresponding to the matrix set S2 may be a bitmap B2 with a length of $N_x$, and each bit in the bitmap may correspond to one matrix in the matrix set S2.

A set of the available matrices in the matrix set S1 determined in accordance with the codebook subset constraint parameters may be $\{Z_1, Z_2, \ldots, Z_{L_1}\}$, where L1 represents the number of the available matrices in the matrix set S1. A set of the available matrices in the matrix set S2 determined in accordance with the codebook subset constraint parameters may be $\{X_1, X_2, \ldots, X_{L_2}\}$, where L2 represents the number of the available matrices in the matrix set S2.

The active codebook consisting of the active precoding matrices in the codebook A' may be $$\left\{ \begin{bmatrix} Z_k \otimes X_l & 0 \\ 0 & Z_k \otimes X_l \end{bmatrix} W_2 \right\}_{k=1,\ldots,L_1; l=1,\ldots,L_2}. \quad (5)$$

It should be appreciated that, the codebook subset constraint parameters may also be represented in the form of index values.

The base station may transmit the determined codebook subset constraint parameters to UE1. UE1 may then determine the available matrices in the matrix set S1 and the matrix set S2 in accordance with the received codebook subset constraint parameters, e.g., determine the matrices corresponding to the bits having a value of 1 in the bitmap as the available matrices. Then, UE1 may determine the active precoding matrix in the codebook A' in accordance with the available matrices in the matrix set S1 and the matrix set S2, with reference to the above formula (5).

Figure 3:
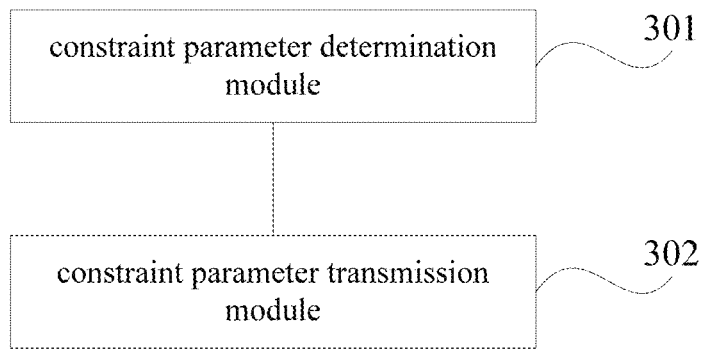
FIG. 3 is a schematic view showing a device for constraining a codebook subset according to one embodiment of the present disclosure.

Based on an identical inventive concept, the present disclosure further provides in some embodiments a device for constraining a codebook subset which, as shown in FIG. 3, includes: a constraint parameter determination module 301 configured to determine codebook subset constraint parameters for all or parts of matrix sets for constructing a codebook respectively, each codebook subset constraint parameter indicating an available matrix in a corresponding matrix set; and a constraint parameter transmission module 302 configured to transmit the determined codebook subset constraint parameters to a UE.

In a possible embodiment of the present disclosure, the constraint parameter determination module is further configured to: determine the codebook subset constraint parameters for all or parts of the matrix sets for constructing the codebook respectively in accordance with a configuration of an antenna array; or determine the codebook subset constraint parameters for all or parts of the matrix sets for constructing the codebook respectively in accordance with an application scenario; or determine the codebook subset constraint parameters for all or parts of the matrix sets for constructing the codebook respectively in accordance with the configuration of the antenna array and the application scenario; or determine the codebook subset constraint parameters for all or parts of the matrix sets for constructing the codebook respectively in accordance with a measurement result of an uplink signal transmitted by the UE; or determine the codebook subset constraint parameters for all or parts of the matrix sets for constructing the codebook respectively in accordance with information returned by the UE; or determine the codebook subset constraint parameters for all or parts of the matrix sets for constructing the codebook respectively in accordance with matrix-available information reported by the UE.

In a possible embodiment of the present disclosure, in the case of determining the codebook subset constraint parameters for all or parts of the matrix sets for constructing the codebook respectively in accordance with the measurement result of the uplink signal transmitted by the UE, the constraint parameter determination module is further configured to: measure the uplink signal transmitted by the UE so as to obtain the measurement result; determine whether or not each matrix in each matrix set for constructing the codebook is available in accordance with the measurement result; and determine the codebook subset constraint parameters for all or parts of the matrix sets for constructing the codebook respectively in accordance with a determination result.

In a possible embodiment of the present disclosure, in the case of measuring the uplink signal transmitted by the UE so as to obtain the measurement result, the constraint parameter determination module is further configured to: measure the uplink signal transmitted by the UE, so as to obtain a horizontal azimuth angle or a vertical azimuth angle of the UE, and in the case of determining whether or not each matrix in each matrix set for constructing the codebook is available in accordance with the measurement result, the constraint parameter determination module is further configured to calculate an array response vector correlation coefficient between each matrix in each matrix subset for constructing the codebook and the horizontal azimuth angle or the vertical azimuth angle, compare the array response vector correlation coefficient with an array response vector correlation coefficient threshold, and determine whether or not the matrix is available in accordance with a comparison result.

In a possible embodiment of the present disclosure, in the case of determining the codebook subset constraint parameters for all or parts of the matrix sets for constructing the codebook respectively in accordance with the information returned by the UE, the constraint parameter determination module is further configured to: rank precoding matrices in a descending order of usage times, select a predetermined number of precoding matrices with the largest usage times in accordance with the information returned by the UE within a predetermined time period, and determine matrices corresponding to the selected precoding matrices; calculate a correlation coefficient between each matrix in each matrix set for constructing the codebook and each of the determined matrices corresponding to the selected precoding matrices, compare the correlation efficient with a matrix correlation coefficient threshold, and determine whether or not the matrix in each matrix subset is available in accordance with a comparison result; and determine the codebook subset constraint parameters for all or parts of the matrix sets for constructing the codebook respectively in accordance with a determination result.

In a possible embodiment of the present disclosure, in case of determining the codebook subset constraint parameters for all or parts of the matrix sets for constructing the codebook respectively in accordance with the information about the matrix-available information reported by the UE, the constraint parameter determination module is configured to: determine whether or not each matrix in each matrix set for constructing the codebook is available in accordance with an available matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook is available in accordance with an unavailable matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook in accordance with a matrix-available weight value indicated in the matrix-available information reported by the UE, and determine the codebook subset constraint parameters for all or parts of the matrix sets for constructing the codebook in accordance with a determination result.

In a possible embodiment of the present disclosure, each codebook subset constraint parameter is a bitmap, and each bit in the bitmap corresponds to a matrix in the matrix set and is used to indicate whether or not the matrix is available; or each codebook subset constraint parameter includes a set of index values, and each index value corresponds to an available matrix in the matrix set; or each codebook subset constraint parameter is a bitmap, and each bit in the bitmap corresponds to a matrix subset in the matrix set and is used to indicate whether or not the matrix subset is available; or each codebook subset constraint parameter includes a set of index values, and each index value corresponds to an available matrix subset in the matrix set.

In a possible embodiment of the present disclosure, the device further includes a secondary constraint module configured to: determine an active codebook of the codebook; generate a bitmap corresponding to the active codebook, each bit in the bitmap corresponding to a precoding matrix in the active codebook and being used to indicate whether or not the precoding matrix is available for calculating and returning CSI; and transmit the bitmap corresponding to the active codebook to the UE.

Figure 4:
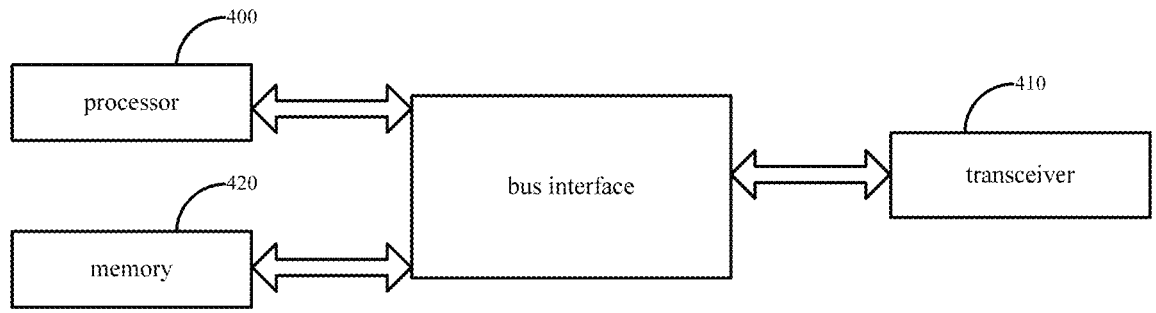
FIG. 4 is a schematic view showing a base station according to one embodiment of the present disclosure.

Based on an identical inventive concept, the present disclosure further provides in some embodiments a base station which, as shown in FIG. 4, includes a processor 400, a memory 420 and a transceiver 410. The processor 400 is configured to read programs stored in the memory 420, so as to: determine codebook subset constraint parameters for all or parts of matrix sets for constructing a codebook respectively, each codebook subset constraint parameter indicating an available matrix in a corresponding matrix set; and transmit through the transceiver 410 the determined codebook subset constraint parameters to a UE.

In FIG. 4, bus architecture may include a number of buses and bridges connected to each other, so as to connect various circuits for one or more processors 400 and one or more memories 420. In addition, as is known in the art, the bus architecture may be used to connect any other circuits, such as a circuit for a peripheral device, a circuit for a voltage stabilizer and a power management circuit. Bus interfaces are provided, and the transceiver 410 may consist of a plurality of elements, i.e., a transmitter and a receiver for communication with any other devices over a transmission medium. The processor 400 may take charge of managing the bus architecture as well as general processings. The memory 420 may store data desired for the operation of the processor 400.

In a possible embodiment of the present disclosure, in the case of determining the codebook subset constraint parameters for all or parts of the matrix sets for constructing the codebook respectively, the processor is further configured to read the programs stored in the memory, so as to: determine the codebook subset constraint parameters for all or parts of the matrix sets for constructing the codebook respectively in accordance with a configuration of an antenna array; or determine the codebook subset constraint parameters for all or parts of the matrix sets for constructing the codebook respectively in accordance with an application scenario; or determine the codebook subset constraint parameters for all or parts of the matrix sets for constructing the codebook respectively in accordance with the configuration of the antenna array and the application scenario; or determine the codebook subset constraint parameters for all or parts of the matrix sets for constructing the codebook respectively in accordance with a measurement result of an uplink signal transmitted by the UE; or determine the codebook subset constraint parameters for all or parts of the matrix sets for constructing the codebook respectively in accordance with information returned by the UE; or determine the codebook subset constraint parameters for all or parts of the matrix sets for constructing the codebook respectively in accordance with matrix-available information reported by the UE.

In a possible embodiment of the present disclosure, in the case of determining the codebook subset constraint parameters for all or parts of the matrix sets for constructing the codebook respectively in accordance with the measurement result of the uplink signal transmitted by the UE, the processor is further configured to read the programs stored in the memory, so as to: measure the uplink signal transmitted by the UE so as to obtain the measurement result; determine whether or not each matrix in each matrix set for constructing the codebook is available in accordance with the measurement result; and determine the codebook subset constraint parameters for all or parts of the matrix sets for constructing the codebook respectively in accordance with a determination result.

In a possible embodiment of the present disclosure, in the case of measuring the uplink signal transmitted by the UE so as to obtain the measurement result, the processor is further configured to read the programs stored in memory, so as to measure the uplink signal transmitted by the UE, so as to obtain a horizontal azimuth angle or a vertical azimuth angle of the UE. In the case of determining whether or not each matrix in each matrix set for constructing the codebook is available in accordance with the measurement result, the processor is further configured to read the programs stored in the memory, so as to calculate an array response vector correlation coefficient between each matrix in each matrix subset for constructing the codebook and the horizontal azimuth angle or the vertical azimuth angle, compare the array response vector correlation coefficient with an array response vector correlation coefficient threshold, and determine whether or not the matrix is available in accordance with a comparison result.

In a possible embodiment of the present disclosure, in case of determining the codebook subset constraint parameters for all or parts of the matrix sets for constructing the codebook respectively in accordance with the information returned by the UE, the processor is further configured to read the programs stored in the memory, so as to: rank precoding matrices in a descending order of usage times, select a predetermined number of precoding matrices with the largest usage times in accordance with the information returned by the UE within a predetermined time period, and determine matrices corresponding to the selected precoding matrices; calculate a correlation coefficient between each matrix in each matrix set for constructing the codebook and each of the determined matrices corresponding to the selected precoding matrices, compare the correlation efficient with a matrix correlation coefficient threshold, and determine whether or not the matrix in each matrix subset is available in accordance with a comparison result; and determine the codebook subset constraint parameters for all or parts of the matrix sets for constructing the codebook respectively in accordance with a determination result.

In a possible embodiment of the present disclosure, in the case of determining the codebook subset constraint parameters for all or parts of the matrix sets for constructing the codebook respectively in accordance with the information about the matrix-available information reported by the UE, the processor is further configured to read the programs stored in the memory, so as to: determine whether or not each matrix in each matrix set for constructing the codebook is available in accordance with an available matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook is available in accordance with an unavailable matrix indicated in the matrix-available information reported by the UE, and determine the codebook subset constraint parameters for all or parts of the matrix sets for constructing the codebook in accordance with a determination result; or determine whether or not each matrix in each matrix set for constructing the codebook in accordance with a matrix-available weight value indicated in the matrix-available information reported by the UE, and determine the codebook subset constraint parameters for all or parts of the matrix sets for constructing the codebook in accordance with a determination result.

In a possible embodiment of the present disclosure, each codebook subset constraint parameter is a bitmap, and each bit in the bitmap corresponds to a matrix in the matrix set and is used to indicate whether or not the matrix is available; or each codebook subset constraint parameter includes a set of index values, and each index value corresponds to an available matrix in the matrix set; or each codebook subset constraint parameter is a bitmap, and each bit in the bitmap corresponds to a matrix subset in the matrix set and is used to indicate whether or not the matrix subset is available; or each codebook subset constraint parameter includes a set of index values, and each index value corresponds to an available matrix subset in the matrix set.

In a possible embodiment of the present disclosure, the processor is further configured to read the programs stored in the memory, so as to: determine an active codebook of the codebook; generate a bitmap corresponding to the active codebook, each bit in the bitmap corresponding to a precoding matrix in the active codebook and used to indicate whether or not the precoding matrix is available for calculating and returning CSI; and transmit through the transceiver the bitmap corresponding to the active codebook to the UE.

Figure 5:
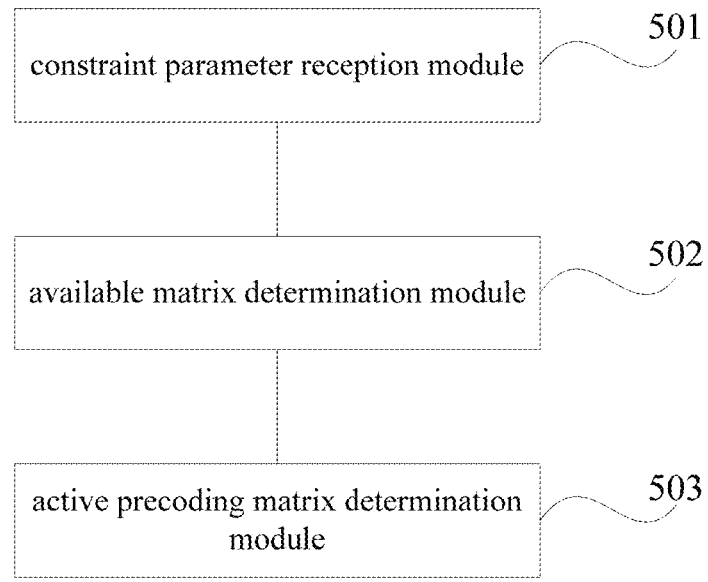
FIG. 5 is another schematic view showing a device for constraining a codebook subset according to one embodiment of the present disclosure.

Based on an identical inventive concept, the present disclosure further provides in some embodiments a device for constraining a codebook subset which, as shown in FIG. 5, includes: a constraint parameter reception module 501 configured to receive codebook subset constraint parameters corresponding to all or parts of matrix sets for constructing a codebook, each codebook subset constraint parameter indicating an available matrix in a corresponding matrix set; an available matrix determination module 502 configured to determine available matrices in each matrix set for constructing the codebook in accordance with the received codebook subset constraint parameters; and an active precoding matrix determination module 503 configured to determine active precoding matrices in the codebook in accordance with the available matrices in each matrix set.

In a possible embodiment of the present disclosure, the active precoding matrix determination module is further configured to: with respect to each precoding matrix in the codebook, determine whether or not all matrices for generating the precoding matrix are available, and determine the precoding matrix in which all the matrices are available as the active precoding matrix; or with respect to each precoding matrix in the codebook, determine whether or not there is at least one available matrix in the matrices for generating the precoding matrix, and determine the precoding matrix where there is at least one available matrix as the active precoding matrix.

In a possible embodiment of the present disclosure, the device further includes a secondary constraint module configured to: determine an active codebook of the codebook in accordance with the determined active precoding matrix, and receive a bitmap corresponding to the active codebook, each bit of the bitmap corresponding to a precoding matrix of the active codebook and being used to indicate whether or not the precoding matrix is available for calculating and returning CSI; and determine the precoding matrix in the active codebook that is available for calculating and returning the CSI in accordance with the bitmap.

In a possible embodiment of the present disclosure, the device further includes a matrix-available information reporting module configured to report matrix-available information.

In a possible embodiment of the present disclosure, the matrix-available information is used to indicate an available matrix, an unavailable matrix, or a matrix-available weight value of each matrix.

In a possible embodiment of the present disclosure, the matrix-available information determination module is further configured to determine the matrix-available information in accordance with usage times within a predetermined time period.

Figure 6:
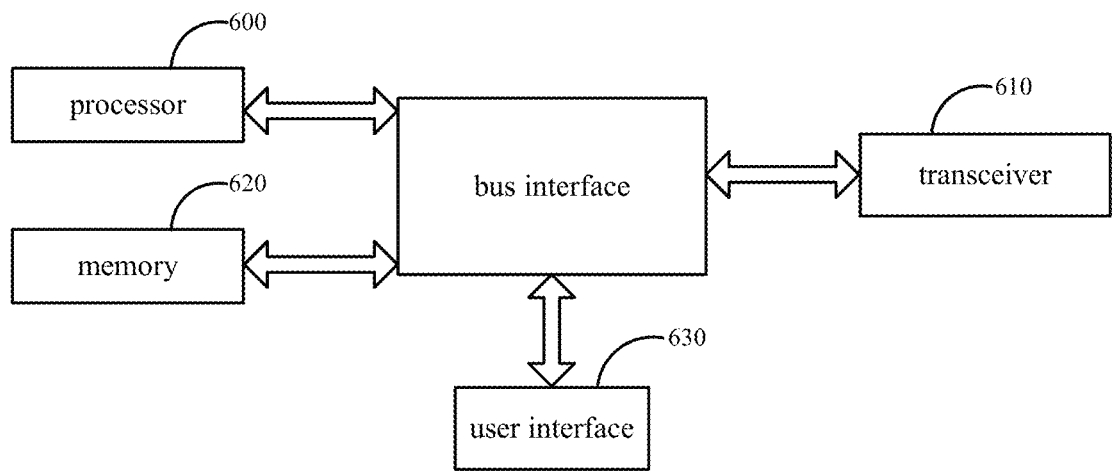
FIG. 6 is a schematic view showing a UE according to one embodiment of the present disclosure.

Based on an identical inventive concept, the present disclosure further provides in some embodiments a UE which, as shown in FIG. 6, includes a processor 600, a memory 620 and a transceiver 610. The processor 600 is configured to read programs stored in the memory 620, so as to: receive through the transceiver 610 codebook subset constraint parameters corresponding to all or parts of matrix sets for constructing a codebook, each codebook subset constraint parameter indicating an available matrix in a corresponding matrix set; determine available matrices in each matrix set for constructing the codebook in accordance with the received codebook subset constraint parameters; and determine active precoding matrices in the codebook in accordance with the available matrices in each matrix set.

In FIG. 6, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. Bus interfaces are provided, and the transceiver 610 may consist of a plurality of elements, i.e., a transmitter and a receiver for communication with any other devices over a transmission medium. With respect to different UEs, a user interface 630 may also be provided for devices which are to be arranged inside or outside the UE, and these devices may include but be not limited to a keypad, a display, a speaker, a microphone and a joystick. The processor 600 may take charge of managing the bus architecture as well as general processings. The memory 620 may store therein data for the operation of the processor 600.

In a possible embodiment of the present disclosure, in the case of determining the active precoding matrices in the codebook, the processor is further configured to read the programs stored in the memory, so as to: with respect to each precoding matrix in the codebook, determine whether or not all matrices for generating the precoding matrix are available, and determine the precoding matrix where all the matrices are available as the active precoding matrix; or with respect to each precoding matrix in the codebook, determine whether or not there is at least one available matrix in the matrices for generating the precoding matrix, and determine the precoding matrix where there is at least one available matrix as the active precoding matrix.

In a possible embodiment of the present disclosure, the processor is further configured to read the programs stored in the memory, so as to: determine an active codebook of the codebook in accordance with the determined active precoding matrix, and receive through the transceiver a bitmap corresponding to the active codebook, each bit of the bitmap corresponding to a precoding matrix of the active codebook and being used to indicate whether or not the precoding matrix is available for calculating and returning CSI; and determine the precoding matrix in the active codebook that is available for calculating and returning the CSI in accordance with the bitmap.

In a possible embodiment of the present disclosure, the processor is further configured to read the programs stored in the memory, so as to report through the transceiver matrix-available information.

In a possible embodiment of the present disclosure, the matrix-available information is used to indicate an available matrix(matrice), an unavailable matrix(matrice), or a matrix-available weight value of each matrix.

In a possible embodiment of the present disclosure, the processor is further configured to read the programs stored in the memory, so as to determine the matrix-available information in accordance with usage times within a predetermined time period.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for constraining a codebook subset, comprising steps of:

measuring, by a network side device, the uplink signal transmitted by a User Equipment (UE), so as to obtain a horizontal azimuth angle or a vertical azimuth angle of the UE;

calculating, by the network side device, an array response vector correlation coefficient between each matrix in each matrix subset for constructing the codebook and the horizontal azimuth angle or the vertical azimuth angle, comparing the array response vector correlation coefficient with an array response vector correlation coefficient threshold, and determining whether or not the matrix is available in accordance with the comparing result;

determining, by the network side device, the codebook subset constraint parameters for all or parts of the matrix sets for constructing the codebook respectively in accordance with the determining result;

each codebook subset constraint parameter indicating an available matrix in a corresponding matrix set; and transmitting, by the network side device, the determined codebook subset constraint parameters to the UE, wherein the available matrix is a matrix used for generating active precoding matrices among the matrix sets for constructing the codebook, wherein the active precoding matrices in the codebook are determined in accordance with the available matrices in each matrix set by:

with respect to each precoding matrix in the codebook, determining whether or not all matrices for generating the precoding matrix are available, and determining the precoding matrix where all the matrices are available as the active precoding matrix; or with respect to each precoding matrix in the codebook, determining whether or not there is at least one available matrix in the matrices for generating the precoding matrix, and determining the precoding matrix where there is at least one available matrix as the active precoding matrix, wherein each precoding matrix in the codebook is generated after a computation operation on matrices in the matrix sets; or one block of each precoding matrix in the codebook is generated after a computation operation on matrices in the matrix sets.

2. The method according to claim 1, wherein each codebook subset constraint parameter is a bitmap, and each bit in the bitmap corresponds to a matrix in the matrix set and is used to indicate whether or not the matrix is available; or each codebook subset constraint parameter comprises a set of index values, and each index value corresponds to an available matrix in the matrix set; or each codebook subset constraint parameter is a bitmap, and each bit in the bitmap corresponds to a matrix subset in the matrix set and is used to indicate whether or not the matrix subset is available; or each codebook subset constraint parameter comprises a set of index values, and each index value corresponds to an available matrix subset in the matrix set.

3. The method according to claim 1, further comprising:

determining an active codebook of the codebook;

generating a bitmap corresponding to the active codebook, each bit in the bitmap corresponding to a precoding matrix in the active codebook and being used to indicate whether or not the precoding matrix is available for calculating and returning Channel State Information (CSI); and transmitting the bitmap corresponding to the active codebook to the UE.

4. A base station, comprising a processor, a transceiver and a memory, wherein the processor is configured to read programs stored in the memory, so as to:

measure the uplink signal transmitted by a User Equipment (UE), so as to obtain a horizontal azimuth angle or a vertical azimuth angle of the UE;

calculate an array response vector correlation coefficient between each matrix in each matrix subset for constructing the codebook and the horizontal azimuth angle or the vertical azimuth angle, compare the array response vector correlation coefficient with an array response vector correlation coefficient threshold, and determine whether or not the matrix is available in accordance with the comparing result;

determine the codebook subset constraint parameters for all or parts of the matrix sets for constructing the codebook respectively in accordance with the determining result each codebook subset constraint parameter indicating an available matrix in a corresponding matrix set; and transmit through the transceiver the determined codebook subset constraint parameters to the UE, wherein the available matrix is a matrix used for generating the active precoding matrices among the matrix sets for constructing the codebook, wherein the active precoding matrices in the codebook are determined in accordance with the available matrices in each matrix set by:

with respect to each precoding matrix in the codebook, the processor being further configured for determining whether or not all matrices for generating the precoding matrix are available, and determining the precoding matrix where all the matrices are available as the active precoding matrix; or with respect to each precoding matrix in the codebook, the processor being further configured for determining whether or not there is at least one available matrix in the matrices for generating the precoding matrix, and determining the precoding matrix where there is at least one available matrix as the active precoding matrix, wherein each precoding matrix in the codebook is generated after a computation operation on matrices in the matrix sets; or one block of each precoding matrix in the codebook is generated after a computation operation on matrices in the matrix sets.

* * * * *